(12) United States Patent
Edenfield et al.

(10) Patent No.: US 6,799,280 B1
(45) Date of Patent: Sep. 28, 2004

(54) SYSTEM AND METHOD FOR SYNCHRONIZING DATA TRANSFER FROM ONE DOMAIN TO ANOTHER BY SELECTING OUTPUT DATA FROM EITHER A FIRST OR SECOND STORAGE DEVICE

(75) Inventors: Robin W. Edenfield, Dallas, TX (US); Christopher D. Bryant, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/477,488

(22) Filed: Jan. 4, 2000

(51) Int. Cl.[7] .................................................. H04L 7/00
(52) U.S. Cl. ...................................... 713/400; 713/410
(58) Field of Search ............................... 713/400, 401; 327/144; 710/21; 368/52

(56) References Cited

U.S. PATENT DOCUMENTS

| | | | | |
|---|---|---|---|---|
| 4,191,930 A | * | 3/1980 | Harzer ........................ | 331/1 A |
| 5,432,823 A | * | 7/1995 | Gasbarro et al. ........... | 375/356 |
| 5,535,377 A | * | 7/1996 | Parks ......................... | 713/400 |
| 5,961,649 A | * | 10/1999 | Khandekar et al. ......... | 713/400 |
| 6,172,540 B1 | * | 1/2001 | Gandhi ....................... | 327/144 |
| 6,275,926 B1 | * | 8/2001 | Samra ......................... | 710/21 |
| 6,473,439 B1 | * | 10/2002 | Zerbe et al. ................ | 370/503 |

OTHER PUBLICATIONS

Nelson et al, Digital Logic Circuit Analysis and Design, 1995 by Prentice–Hall, pp. 398–399.*
IBM Technical Research Disclosure NNRD41184, Configurable Data Path Delay Element Utilizing a Synchronous FIFO, Jul. 1, 1998, vol. 41 issue 411.*

* cited by examiner

*Primary Examiner*—Thomas Lee
*Assistant Examiner*—Mark Connolly (57) ABSTRACT

An interface circuit is disclosed for synchronizing the transfer of data from a first clock domain driven by a first clock signal to a second clock domain driven by a second clock signal, where the phase and frequency relationships of the first and second clock signals are known. The interface circuit comprises: 1) a flip-flop having a data input for receiving a first data signal from the first clock domain, a clock input for receiving the first clock signal, and an output; 2) a latch having a data input coupled to the flip-flop output, a clock input for receiving a gating signal, and an output; and 3) a multiplexer having a first data input coupled to the flip-flop output, a second data input coupled to the latch output, and a selector input for selecting one of the first and second data inputs for the multiplexer output.

15 Claims, 5 Drawing Sheets

SYSTEM AND METHOD FOR SYNCHRONIZING DATA TRANSFER FROM ONE DOMAIN TO ANOTHER BY SELECTING OUTPUT DATA FROM EITHER A FIRST OR SECOND STORAGE DEVICE

CROSS-REFERENCE TO RELATED APPLICATION

The present invention is related to that disclosed in U.S. patent application Ser. No. 09/477,321 (now U.S. Pat. No. 6,535,946 B1), filed concurrently herewith, entitled LOW-LATENCY CIRCUIT FOR SYNCHRONIZING DATA TRANSFERS BETWEEN CLOCK DOMAINS DERIVED FROM A COMMON CLOCK. The above application is commonly assigned to the assignee of the present invention. The disclosure of the related patent application is hereby incorporated by reference for all purposes as if fully set forth herein.

TECHNICAL FIELD OF THE INVENTION

The present invention is directed, in general, to microprocessors and, more specifically, to synchronization circuits for transferring data between two different clock domains in a processing device.

BACKGROUND OF THE INVENTION

The ever-growing requirement for high performance computers demands that state-of-the-art microprocessors execute instructions in the minimum amount of time. Over the years, efforts to increase microprocessor speeds have followed different approaches, including increasing the speed of the clock that drives the processor and reducing the number of clock cycles required to perform a given instruction.

Microprocessor speeds may also be increased by reducing the number of gate delays incurred while executing an instruction. Under this approach, the microprocessor is designed so that each data bit or control signal propagates through the least number of gates needed to perform an instruction. Additionally, the propagation delay through each individual gate is also minimized in order to further reduce the end-to-end propagation delay associated with transmitting a control signal or a data bit during the execution of an instruction.

One area where it is important to minimize propagation delays occurs at the interface between clock domains. Conventional microprocessors contain many clock signals that are derived from a basic high-frequency core clock. The core clock signal may be divided down to produce clock signals that are related, for example, by an N:1 ratio or by an (N+2):1 ratio. For instance, dividing the core clock by two and dividing the core clock by four yields two clock signals that are in a 2:1 ratio. Similarly, dividing the core clock by two and dividing the core clock by seven yields two clock signals that are in a 3.5:1 ratio.

At the interface between two clock domains, there is no guarantee that a signal transmitted from a first clock domain will be synchronized with the clock in a second clock domain. Normally, synchronization between different clock domains is handled by a set of synchronizing flip-flops. A signal in a first clock domain is first registered in a flip-flop in the first clock domain. The output of that first flip-flop is then Adouble sampled@ by two flip-flops in the second clock domain. Double sampling means that the output of the first flip-flop feeds the input of a second flip-flop clocked in the second clock domain. The output of the second flip-flop feeds the input of a third flip-flop that also is clocked in the second clock domain. The output of this third flip-flop is properly synchronized with the second clock domain. An identical three flip-flop interface circuit is used to synchronize signals that are being transmitted in the reverse direction (i.e., from the second clock domain to the first clock domain). This synchronizing circuit along with grey code encoding of multi-bit signals provides a means for synchronizing two asynchronous clock domains.

The chief drawback of the above-described flip-flop interface circuit is the fact that there are three gate propagation delays involved in transmitting a signal from one clock domain to another clock domain. This necessarily slows down the operation of the microprocessor, since the circuits in the receiving domain receive the transmitted signal only after at least three propagation delays.

Therefore, there is a need in the art for improved microprocessor designs that maximize processor throughput. In particular, there is a need in the art for improved circuits that interface signals between different clock domains. More particularly, there is a need for interface circuits that minimize the number of gate delays that affect a signal being transmitted from a faster clock domain to a slower clock domain, and vice versa.

SUMMARY OF THE INVENTION

The limitations inherent in the prior art described above are overcome by the present invention, which provides an interface circuit for synchronizing the transfer of data from a first clock domain driven by a first clock signal to a second clock domain driven by a second clock signal. In an advantageous embodiment of the present invention, the interface circuit comprises 1) a flip-flop having a data input for receiving a first data signal from the first clock domain, a clock input for receiving the first clock signal, and an output; 2) a latch having a data input coupled to the flip-flop output, a clock input for receiving a gating signal, and an output; and 3) a multiplexer having a first data input coupled to the flip-flop output, a second data input coupled to the latch output, and a selector input for selecting one of the first data input and the second data input for transfer to an output of the multiplexer.

In one embodiment of the present invention, the second clock signal and the first clock signal are derived from a common core clock.

In another embodiment of the present invention, a frequency of the second clock signal and a frequency of the first clock signal are in a ratio of N:1 where N is an integer.

In still another embodiment of the present invention, a frequency of the second clock signal and a frequency of the first clock signal are in a ratio of (N+2):1 where N is an integer.

In yet another embodiment of the present invention, a selection signal applied to the selector input selects the first data input of the multiplexer when a rising edge of the first clock signal is approximately in phase with a rising edge of the second clock signal.

In a further embodiment of the present invention, the selection signal is applied to the selector input during one clock period of the first clock signal.

In a still further embodiment of the present invention, the gating signal is applied. to the latch clock input when the selection signal is applied to the selector input and during a low phase of the first clock signal.

In a yet further embodiment of the present invention, the interface circuit further comprises a second interface circuit for synchronizing the transfer of data from the second clock domain to the first clock domain, wherein the second interface circuit comprises: 1) a flip-flop having a data input for receiving a first data signal from the second clock domain, a clock input for receiving the second clock signal, and an output; 2) a latch having a data input coupled to the flip-flop output, a clock input for receiving the first clock signal, and an output; and 3) a multiplexer having a first data input coupled to the flip-flop output, a second data input coupled to the latch output, and a selector input for selecting one of the first data input and the second data input for transfer to an output of the multiplexer.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, reference is now made to the following descriptions taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged integrated microprocessor.

Integrated Processor System

Figure 1:
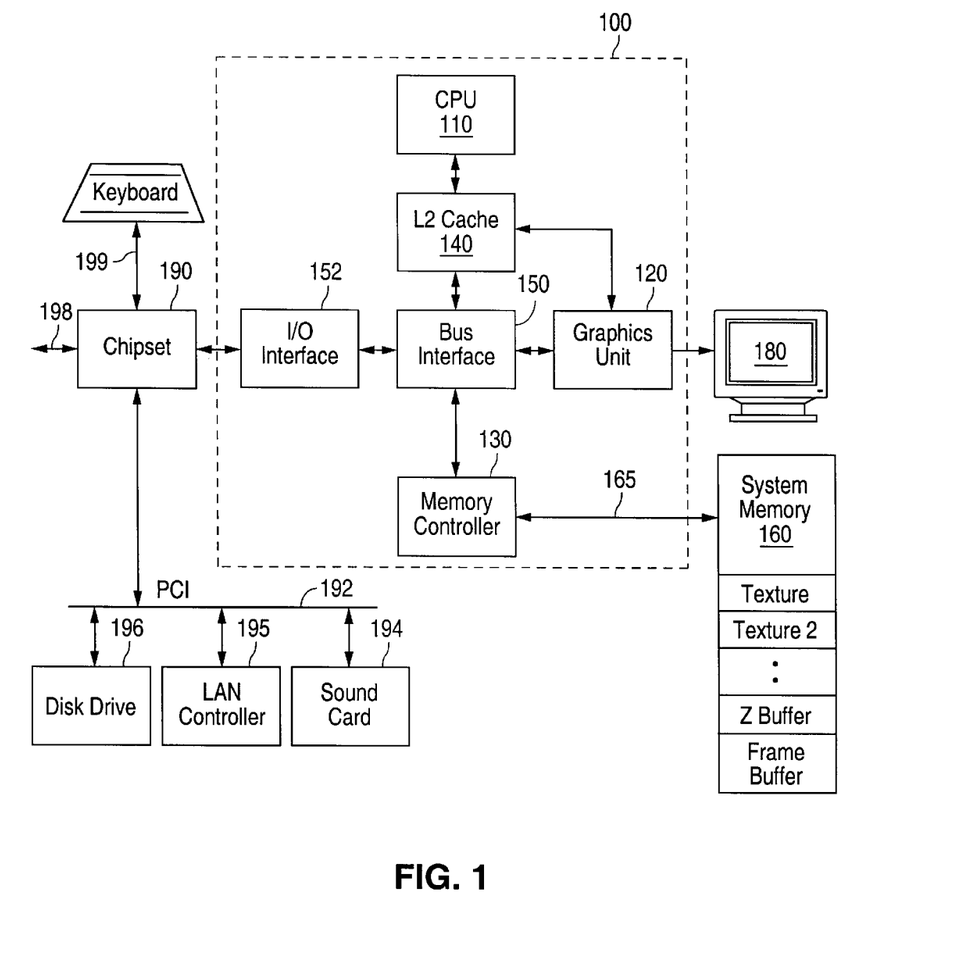
FIG. 1 is a block diagram of an exemplary integrated processor system, including an integrated microprocessor in accordance with the principles of the present invention.

FIG. 1 is a block diagram of an exemplary integrated processor system, including integrated processor 100 in accordance with the principles of the present invention. Integrated microprocessor 100 includes central processing unit (CPU) 110, which has dual integer and dual floating point execution units, separate load/store and branch units, and L1 instruction and data caches. Integrated onto the microprocessor die is graphics unit 120, system memory controller 130, and L2 cache 140, which is shared by CPU 110 and graphics unit 120. Bus interface unit 150 interfaces CPU 110, graphics unit 120, and L2 cache 140 to memory controller 130.

Integrated memory controller 130 bridges processor 100 to system memory 160, and may provide data compression and/or decompression to reduce bus traffic over external memory bus 165 which preferably, although not exclusively, has a RAMbusJ, fast SDRAM or other type protocol. Integrated graphics unit 120 provides TFT, DSTN, RGB, and other types of video output to drive display 180.

Bus interface unit 150 interfaces, through I/O interface 152, processor 100 to chipset bridge 190 for conventional peripheral bus 192 connection (e.g., PCI connection) to peripherals, such as sound card 194, LAN controller 195, and disk drive 196, as well as fast serial link 198 (e.g., IEEE 1394 "firewire" bus and/or universal serial bus "USB") and relatively slow I/O port 199 for peripherals, such as a keyboard and/or a mouse. Alternatively, chipset bridge 190 may integrate local bus functions such as sound, disk drive control, modem, network adapter, etc.

Integrated CPU

Figure 2:
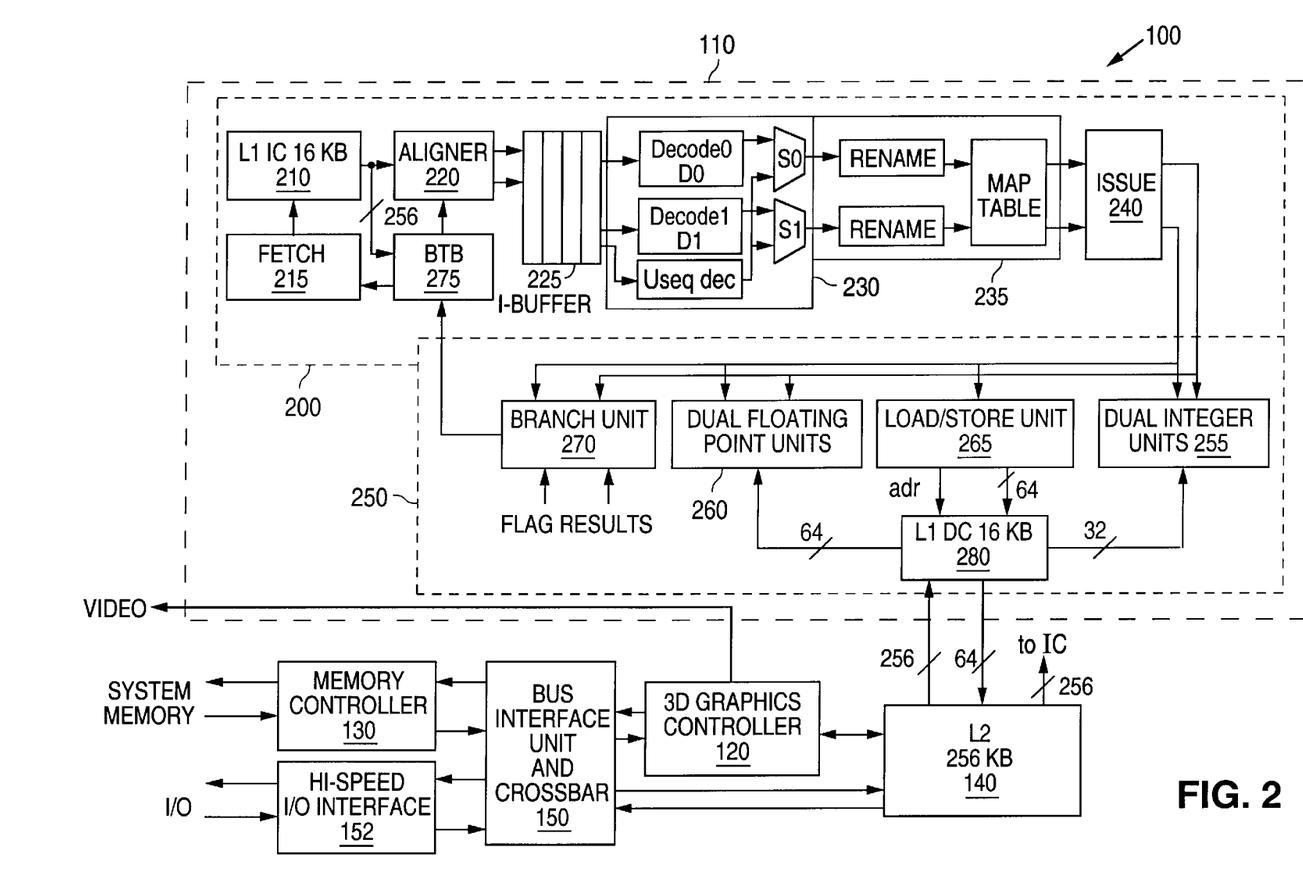
FIG. 2 illustrates in more detail the exemplary integrated microprocessor in FIG. 1 in accordance with one embodiment of the present invention.

FIG. 2 illustrates in more detail the exemplary integrated processor 100, including CPU 110, which is integrated with graphics controller 120, memory controller 130, and L2 unified cache 140 (e.g., 256 KB in size). CPU 110 includes an execution pipeline with instruction decode/dispatch logic 200 and functional units 250.

Instruction decode/dispatch logic 200 decodes variable length x86 instructions into nodes (operations) each containing source, destination, and control logic. Each instruction maps into one or more nodes, which are formed into checkpoints for issue in parallel to functional units 250. The exemplary execution pipeline includes dual integer units (EX) 255, dual pipelined floating point units (FP) 260, load/store unit (LDST) 265, and branch unit (BR) 270. Hence, a single checkpoint can include up to 2 EX, 2 FP, 1 LDST, and 1 BR nodes which can be issued in parallel. L1 data cache (DC) 280 (e.g., 16 KB in size) receives data requests from the LDST unit and, in the case of an L1 hit, supplies the requested data to appropriate EX or FP unit.

BR unit 270 executes branch operations based on flag results from the EX units. Predicted (taken/not-taken) and not-predicted (undetected) branches are resolved (mispredictions incur, for example, a 12 clock penalty) and branch information is supplied to BTB 275, including branch address, target address, and resolution (taken or not taken). BTB 275 includes a 1 KB target cache, a 7-bit history and prediction ROM, and a 16-entry return stack.

Instruction decode/dispatch logic 200 includes L1 instruction cache (IC) 210 (e.g., 16 KB in size) which stores 32-byte cache lines (8 dwords/4 qwords). Each fetch operation, fetch unit 215 fetches a cache line of 32 instruction bytes from the L1 instruction cache to aligner logic 220. Fetch unit 215 either (a) generates a fetch address by incrementing the previous fetch address (sequential fetch) or, (b) if the previous fetch address hit in BTB 275, switches the code stream by supplying the fetch address for the cache line containing the target address provided by BTB 275. Fetch unit 215 supplies a linear address simultaneously to L1 instruction cache 210 and BTB 275. A two-level translation look-aside buffer (TLB) structure (a 32-entry L1 instruction TLB and a 256-entry shared L2 TLB) supplies a corresponding physical address to the L1 cache to complete cache access.

Aligner logic 220 identifies up to two x86 variable length instructions per clock. Instructions are buffered in instruction buffer 225, along with decode and issue constraints. Decoder 230 transfers instructions from the instruction buffer to the appropriate one (as determined by decode constraints stored with the instruction) of decoders D0, D1, and Useq (a microsequencer). D0 and D1 define two decode slots (or paths) S0 and S1, with the Useq decoder feeding nodes into both slots simultaneously.

D0 and D1 each decode single node EX/FPU/BR instructions that do not involve memory references (e.g., register-register integer and floating point operations and branch operations), while memory reference instructions, which decode into separate EX/FP and LDST nodes (e.g., register-memory integer and floating point operations), are constrained to D0. The Useq decoder handles instructions that decode into more than two nodes/operations (e.g., far calls/returns, irets, segment register loads, floating point divides, floating point transcendentals). Each such sequence of nodes are organized into one or more separate checkpoints issued in order to the functional units. Renaming logic 235 (including a logical-to-physical map table) renames sources and destinations for each node, mapping logical to physical registers.

Issue logic 240 organizes the renamed nodes from each slot into checkpoints that are scheduled for issue in order to the functional units. Most instructions can be dual issued with the nodes for each in the same checkpoint. Up to 16 checkpoints may be active (i.e., issued to functional units). Nodes are issued into reservation stations in each functional unit. Once in the reservation stations, the nodes complete execution out-of-order.

The dual EX0/EX1 (integer) units 255 are pipelined with separate copies of a physical register file, and execute and forward results in a single cycle. The dual FPU0/FPU1 units 260 include dual execution units (with separate FP physical register files) that support MMX and 3DNow instructions, as well as standard x87 floating point, instruction execution. FPU0 includes a pipelined FAdder and FPU1 includes a pipelined Fmultipler, both supporting packed SIMD operations.

Integer multiply operations are issued to FPU1 with the Fmultiplier, and integer divide operations are issued as separate nodes to both FPU0 and FPU1, so that integer EX operations can execute in parallel with integer multiplies and divides. Results are forwarded between EX0/EX1 and FPU0/FPU1 in a single cycle.

LDST unit 265 executes memory reference operations as loads/stores to/from data cache 280 (or L2 cache 140). LDST unit 265 performs pipelined linear address calculation and physical (paged) address translation, followed by data cache access with the physical (translated) address. Address translations are performed in order using a two-level TLB structure (a 32 entry L1 data TLB and the 256 entry shared L2 TLB). Up to four pending L1 misses can be outstanding. Missed data returns out of order (from either L2 cache 140 or system memory 160).

Exemplary 16 KB L1 instruction cache 210 is single-ported 4-way associative, with 2 pending misses. Exemplary 16 KB L1 data cache 280 is non-blocking, dual-ported (one load port and one store/fill port), 4-way associative, with 4 pending misses. Both L1 caches are indexed with the linear address and physically tagged with the TLB (translated) address. In response to L1 misses, L2 cache 140 transfers an entire cache line (32 bytes/256 bits) in one cycle with a 7 clock access latency for L1 misses that hit in L2 cache 140.

Exemplary 256 KB L2 cache 140 is 8-way associative and 8-way interleaved. Each interleave supports one L1 (code/data) miss per cycle, and either one L1 store or one L2 fill per cycle. Portions or all of 2 of the 8 ways may be locked down for use by graphics controller 120.

For integer register-to-register operations, the execution pipeline is eleven (11) stages from code fetch to completion: two cache access stages (IC1 and IC2), two alignment stages (AL1 and AL2), three decode/rename stages (DEC0–DEC2), checkpoint issue stage (ISS), and reservation stage (RS), followed by the execute and result writeback/forward stages (EX and WB). For integer register-memory operations, the LDST unit pipeline adds an additional four stages between RS and EX: address calculation (AC), translation (XL), and data cache access and drive back DC and DB. The floating point adder pipeline comprises four stages and the floating point multiply pipeline comprises five stages.

Different functional blocks in integrated processor 100 may operate at different clock speeds. Each group of circuits that are driven at a specified clock speed is referred to as a clock domain. As described above in the Background, special synchronization circuitry is needed to transfer data from one clock domain to another clock domain. However, because all of the clock domains in integrated processor 100 are derived from a common core clock, the phase and frequency relationships between the different clock domains are known. The present invention use knowledge of the phase and frequency relationships between clock domains to provide unique synchronization circuits that minimize the number of gates and clock delays encountered when transferring data from one domain to another domain.

Figure 3:
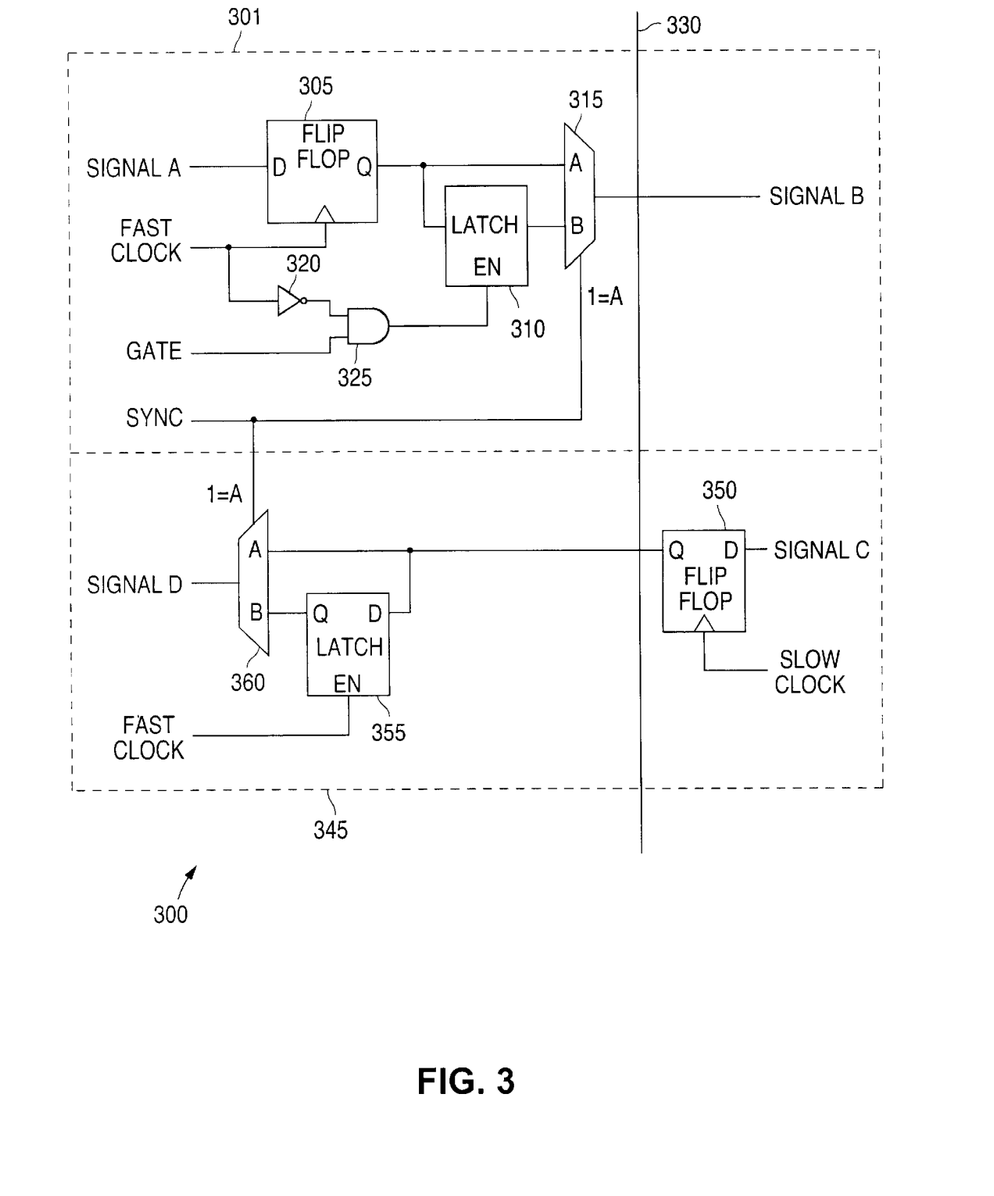
FIG. 3 is a schematic diagram of a synchronization circuit for synchronizing the transfer of data between two asynchronous clock domains.

FIG. 3 is a schematic diagram of synchronizing circuit 300 for synchronizing the transfer of data between two asynchronous clock domains. Synchronizing circuit 300 is comprised of a fast clock synchronizing circuit 301 and a slow clock synchronizing circuit 345, with SYNC and FAST CLOCK input signals being shared by both circuits. Boundary line 330 represents the interface between the fast and slow clock domains.

The present invention takes advantage of the fact that the frequency and phase relationships between SLOW CLOCK and FAST CLOCK are known in order to drive data signals from one clock domain to the other with the least number of clock delays possible. This is accomplished in part by the SYNC and GATE signals, which are derived from counter circuits driven by the same core clock that generates FAST CLOCK and SLOW CLOCK. SYNC and GATE selectively enable the components in the unique synchronizing circuit 300 in order to minimize propagation delays. When the frequency ratio bet ween FAST CLOCK and SLOW CLOCK is modified from an integer multiple to an integer-plus-one half multiple, the SYNC and GATE signals are modified accordingly, as seen below in FIG. 5.

Fast clock synchronizing circuit 301 is comprised of flip-flop 305, latch 310, multiplexer 315, inverter 320, and AND gate 325. Flip-flop 305 transfers input data SIGNAL A to its output on the rising edge of FAST CLOCK. Inverter 320 inverts the FAST CLOCK signal for input to AND gate 325. AND gate 325 provides an output signal equivalent to the logic AND function of the GATE input signal and the inverted FAST CLOCK from inverter 320. Latch 310 receives inputs from flip-flop 305 and AND gate 325 and provides a latched output to multiplexer 315. Flip-flop 305 transfers data on its input to its output on the rising edge of its clock signal. The output of flip-flop 305 serves as the input to latch 310 and the output of AND gate 325 is the clock for latch 310. Multiplexer 315 selects the inputs from flip-flop 305 and latch 310 as controlled by the SYNC input and outputs SIGNAL B, which is synchronized with SLOW CLOCK signal in the slow clock domain.

Slow clock synchronizing circuit 345 is comprised of flip-flop 350, latch 355, and multiplexer 360. Located in the slow clock domain, flip-flop 350 transfers the logic state of input data SIGNAL C to its output on the rising edge of SLOW CLOCK. The output of flip-flop 350 crosses the clock domain border 330 to the FAST CLOCK domain and is connected to the inputs of latch 355 and multiplexer 360. Latch 355 provides an output which represents the output of flip-flop 350 adjusted to coincide with the rising edge of input FAST CLOCK cycle. In other words, latch 355 transfers the output of flip-flop 350 to the output of latch 355 on the rising edge of FAST CLOCK. Multiplexer 360 selects the output of flip-flop 350 as SIGNAL D during the Logic 1 interval of SYNC and selects the output of latch 355 as SIGNAL D during the Logic 0 interval of SYNC.

Figure 4:
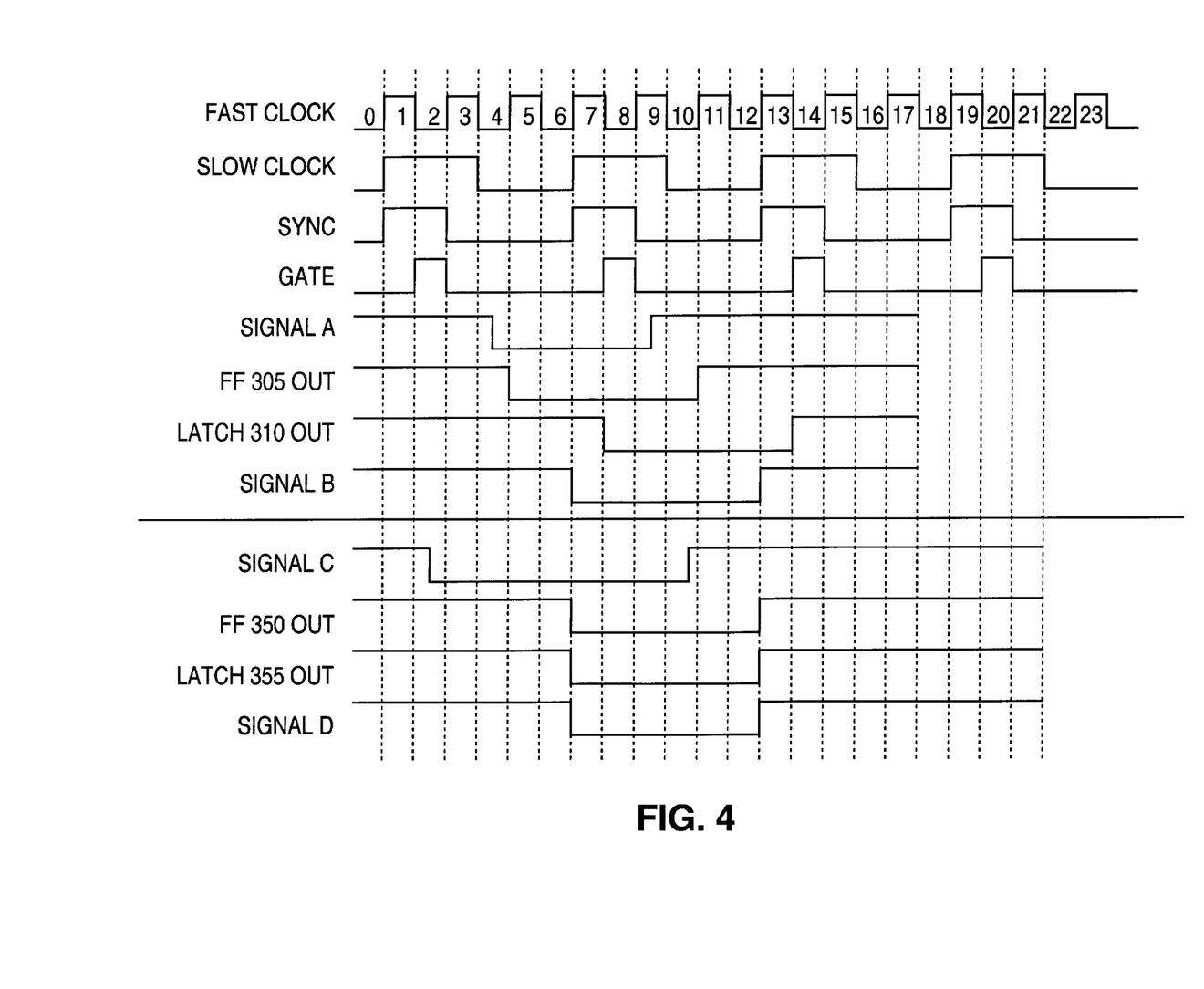
FIG. 4 is a timing diagram illustrating the operation of the synchronization circuit illustrated in FIG. 3 in accordance with an exemplary embodiment of the present invention.

FIG. 4 is a timing diagram illustrating the operation of synchronizing circuit 300 in accordance with an exemplary embodiment of the present invention. The previously described system input signals are represented by SIGNAL A, SIGNAL C, FAST CLOCK, SLOW CLOCK, GATE, and SYNC. Each half clock cycle of FAST CLOCK is numbered, beginning with A0," such that each Logic 0 interval of the FAST CLOCK cycle is designated with an even integer and each Logic 1 interval of FAST CLOCK is designated with an odd integer. As shown for this embodiment, FAST CLOCK is an integer multiple of SLOW CLOCK, operating at three times the frequency of SLOW CLOCK and with transitions of SLOW CLOCK corresponding with transitions of FAST CLOCK.

SYNC signal is Logic 1 during the first FAST CLOCK cycle (1–2, 7–8, etc.) associated with the Logic 1 interval of SLOW CLOCK. The GATE signal Logic 1 duration occurs during the second half of the FAST CLOCK cycle and during the presence of the Logic 1 SYNC pulse. Thus, SYNC and GATE signals are both at a Logic 1 level during a portion of the time that SLOW CLOCK is also a Logic 1. Input data signals, SIGNAL A and SIGNAL C, are representative of data in the fast and slow clock domains, respectively, though no particular relationship is required to exist between the data and various input clock signals.

Flip-flop 305 transfers the input state (i.e., Logic 1 or Logic 0) of SIGNAL A to its output (Flip-Flop 305 Out) on the rising edge of FAST CLOCK. Flip-flop 305 maintains the Logic 1 or Logic 0 on its output until a different logic level on Signal A is clocked by the positive transition of FAST CLOCK. Inverter 320 receives FAST CLOCK on its input and provides an inverted FAST CLOCK on its output to AND gate 325. When GATE and inverted FAST CLOCK are both Logic 1, AND gate 325 generates a Logic 1 output. Otherwise, AND gate 325 remains at Logic 0 output.

As previously noted, the output of flip-flop 305 is provided to the Data input of latch 310 and the output of AND gate 325 is applied to the Enable input of latch 310. As shown by the timing signal labeled Latch 310 OUT, latch 310 maintains a Logic 1 output until the output of AND gate 325 transitions to Logic 1 when FF 305 Out is Logic 0. For instance, this transition is shown during the falling edge of FAST CLOCK transition between pulses 7 and 8. Once clocked to Logic 0, latch 310 Out remains Logic 0 until AND gate 325 transitions its output to Logic 1 when FF 305 OUT is also a Logic 1, as shown for the falling edge between FAST CLOCK pulses 10 and 11. Multiplexer 315 transfers the output of latch 310 to its output SIGNAL B when SYNC is Logic 0 and the output of flip-flop 305 to its output SIGNAL B while SYNC is Logic 1.

In a similar manner, flip-flop 350 transfers SIGNAL C to its output on the rising edge of SLOW CLOCK, as shown by FF 350 Out signal in FIG. 4. The output of FF 350 is an input to latch 355 and multiplexer 360. Latch 355 maintains a Logic 1 on its output (Latch 355 Out) as long as FF 350 OUT is a Logic 1 and FAST CLOCK is a Logic 1. Latch 355 provides a Logic 0 at Latch 355 Out when FAST CLOCK transitions to a Logic 1 and FF 350 Out is Logic 0. Latch 355 maintains the Logic 0 until FAST CLOCK transitions to a Logic 1 while FF 350 Out is a Logic 1.

Multiplexer 360 provides a Logic 1 output when SYNC and FF 350 Out are both Logic 1 or when Latch 355 Out is Logic 1 and SYNC is Logic 0. Otherwise, multiplexer 360 provides a Logic 0 when FF 350 Out is Logic 0 and SYNC is Logic 1, or Latch 355 Out is Logic 0 and SYNC is Logic 0. Thus, multiplexer 360 provides an output that synchronizes SIGNAL D with rising edges of FAST CLOCK, as shown in the timing diagram of FIG. 4.

Figure 5:
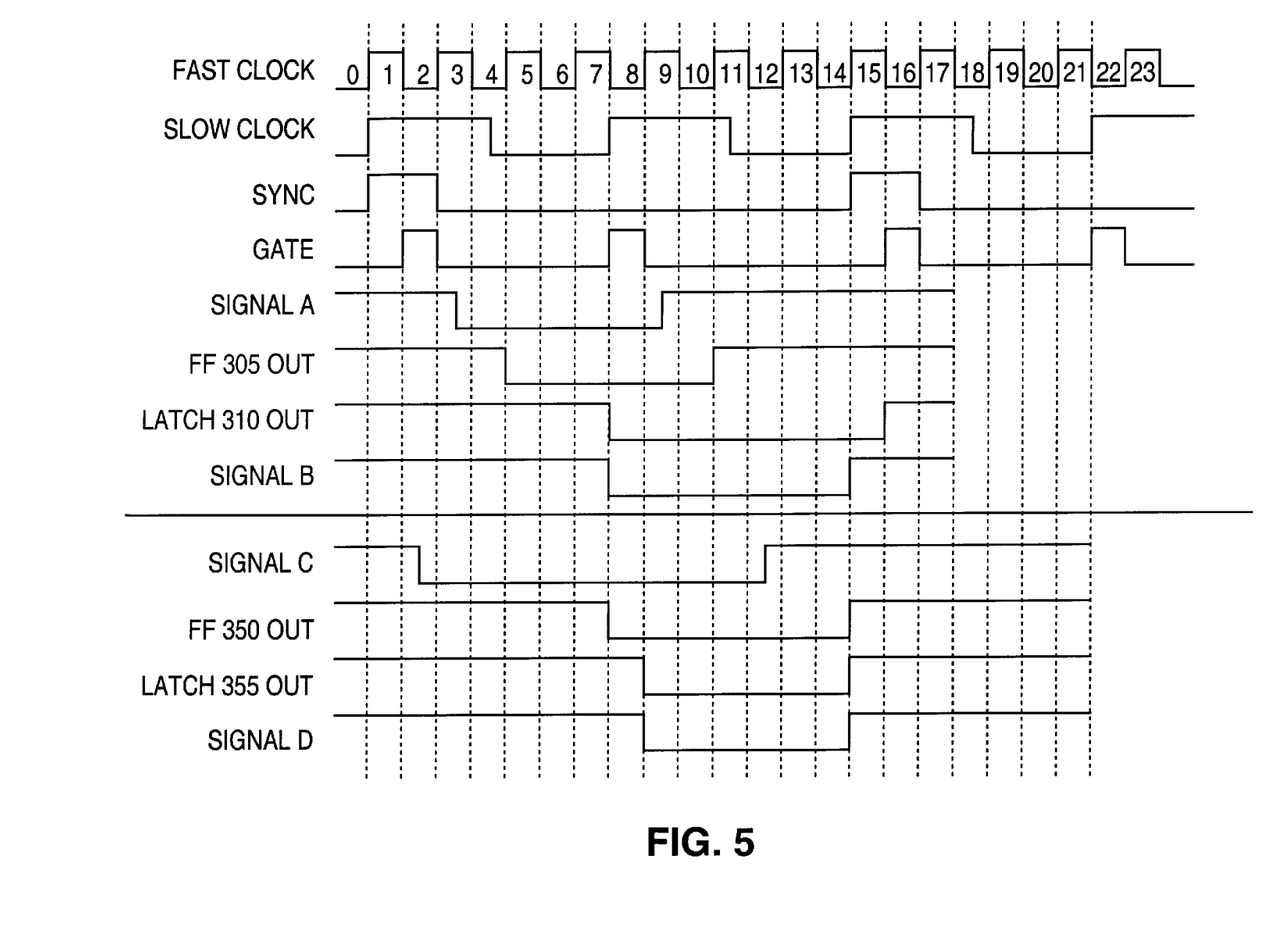
FIG. 5 is a timing diagram illustrating the operation of the synchronization circuit illustrated in FIG. 3 in accordance with an exemplary embodiment of the present invention.

FIG. 5 is a timing diagram illustrating the operation of the synchronization circuit illustrated in FIG. 3, in accordance with an exemplary embodiment of the present invention. In this embodiment, FAST CLOCK is an integer-plus-one half multiple of SLOW CLOCK. Specifically, 3.5 FAST CLOCK cycles occur for every SLOW CLOCK cycle shown in FIG. 5.

The synchronization circuit of FIG. 3 operates in the same manner as previously described, even though the relationship of the FAST CLOCK and SLOW CLOCK have changed. Referring to FIG. 5, flip-flop 305 maintains a Logic 1 from SIGNAL A on its output until SIGNAL A is at a Logic 0 when FAST CLOCK transitions to a Logic 1. At that time, flip-flop 305 transitions its output to a Logic 0 as shown during the rising edge of FAST CLOCK pulse 5. Flip-flop 305 maintains the Logic 0 on flip-flop 305 OUT until it transfers the Logic 1 on SIGNAL A to its output during the rise of FAST CLOCK pulse 11. The remaining circuits function as previously described to generate the FIG. 5 timing signals represented by Latch 310 Out, SIGNAL B, FF 350 Out, Latch 355 Out, and SIGNAL D. The differences in SIGNAL D with respect to FF 350 Out for FIGS. 4 and 5, more clearly illustrates the change in SIGNAL D with respect to relationship differences between FAST CLOCK, SLOW CLOCK, and SYNC.

Although the present invention has been described in detail, those skilled in the art should understand that they can make various changes, substitutions and alterations herein without departing from the spirit and scope of the invention in its broadest form.

What is claimed is:

1. An interface circuit for synchronizing the transfer of data from a first clock domain driven by a first clock signal to a second clock domain driven by a second clock signal, the interface circuit comprising:

a flip-flop having a data input for receiving a first data signal from a first clock domain, a clock input for receiving a first clock signal, and an output;

a latch having a data input coupled to said flip-flop output and a clock input for receiving a gating signal, and an output;

a multiplexer having a first data input coupled to said flip-flop output, a second data input coupled to said latch output, and a selector input for selecting one of said first data input or said second data input for transfer to an output of said multiplexer, wherein said first data input of said multiplexer is selected in response to a rising edge of said first clock signal being approximately in phase with a rising edge of said second clock signal; and wherein said second clock signal and said first clock signal are derived from a common core clock.

2. The interface circuit set forth in claim 1 wherein a frequency of said second clock signal and a frequency of said first clock signal are in a ratio of N:1 where N is an integer.

3. The interface circuit set forth in claim 1 wherein a frequency of said second clock signal and a frequency of said first clock signal are in a ratio of (N+2):1 where N is an integer.

4. The interface circuit set forth in claim 1 wherein said selection signal is applied to said selector input during one clock period of said first clock signal.

5. The interface circuit set forth in claim 4 wherein said gating signal is applied to said latch clock input when said selection signal is applied to said selector input and during a low phase of said first clock signal.

6. The interface circuit set forth in claim 1 further comprising a second interface circuit for synchronizing the transfer of data from said second clock domain to said first clock domain, said second interface circuit comprising:

a flip-flop having a data input for receiving a first data signal from said second clock domain, a clock input for receiving said second clock signal, and an output;

a latch having a data input coupled to said flip-flop output, a clock input for receiving said first clock signal, and an output; and a multiplexer having a first data input coupled to said flip-flop output, a second data input coupled to said latch output, and a selector input for selecting one of said first data input and said second data input for transfer to an output of said multiplexer.

7. A computer system comprising:

a pipelined processor having dual integer and dual floating point execution units, separate load/store and branch units, an LI instruction cache and an LI data cache;

system memory for storing data or instructions;

a core clock;

an interface circuit for synchronizing the transfer of data from a first clock domain driven by a first clock signal in said processor to a second clock domain driven by a second clock signal in said processor, the interface circuit comprising:

a flip-flop having a data input for receiving a first data signal from a first clock domain, a clock input for receiving said first clock signal, and an output;

a latch having a data input coupled to said flip-flop output, a clock input for receiving a dating signal, and an output;

a multiplexer having a first data input coupled to said flip-flop output, a second data input coupled to said latch output, and a selector input for selecting one of said first data input or said second data input for transfer to an output of said multiplexer, wherein said first data input of said multiplexer is selected in response to a rising edge of said first clock signal being approximately in phase with a rising edge of said second clock signal; and wherein said second clock signal and said first clock signal are derived from said core clock.

8. The computer system set forth in claim 7 wherein a frequency of said second clock signal and a frequency of said first clock signal are in a ratio of N:1 where N is an integer.

9. The computer system set forth in claim 8 wherein said selection signal is applied to said selector input during one clock period of said first clock signal.

10. The computer system set forth in claim 7 wherein a frequency of said second clock signal and a frequency of said first clock signal are in a ratio of (N+2):1 where N is an integer.

11. The computer system set forth in claim 10 wherein said gating signal is applied to said latch clock input when said selection signal is applied to said selector input and during a low phase of said first clock signal.

12. The computer system set forth in claim 7 further comprising a second interface circuit for synchronizing the transfer of data from said second clock domain to said first clock domain, said second interface circuit comprising:

a flip-flop having a data input for receiving a first data signal from said second clock domain, a clock input for receiving said second clock signal, and an output;

a latch having a data input coupled to said flip-flop output, a clock input for receiving said first clock signal, and an output; and a multiplexer having a first data input coupled to said flip-flop output, a second data input coupled to said latch output, and a selector input for selecting one of said first data input and said second data input for transfer to an output of said multiplexer.

13. For use in a processor, a method for synchronizing the transfer of data from a first clock domain driven by a first clock signal to a second clock domain driven by a second clock signal comprising the steps of:

receiving a first data signal from the first clock domain into a flip-flop having a data input, a clock input for receiving the first clock signal, and an output;

sampling the output of the flip-flop using a latch having a data input coupled to the flip-flop output, a clock input for receiving a gating signal, and an output; and selecting one of the output of the flip-flop and the output of the latch using a multiplexer having a first data input coupled to the flip-flop output, a second data input coupled to the latch output, and a selector input for selecting one of the first data input or said second data input for transfer to an output of the multiplexer; wherein a selection signal applied to the selector input selects the first data input of the multiplexer when a rising edge of the first clock signal is approximately in phase with a rising edge of the second clock signal.

14. The method set forth in claim 13 wherein the selection signal is applied to the selector input during one clock period of the first clock signal.

15. The method set forth in claim 14 wherein the gating signal is applied to the latch clock input when the selection signal is applied to the selector input and during a low phase of the first clock signal.

* * * * *

UNITED STATES PATENT AND TRADEMARK OFFICE
CERTIFICATE OF CORRECTION

PATENT NO.    : 6,799,280 B1
DATED         : September 28, 2004
INVENTOR(S)   : Robin W. Edenfield and Christopher D. Bryant It is certified that error appears in the above-identified patent and that said Letters Patent is hereby corrected as shown below:

Title page,
Item [56], References Cited, U.S. PATENT DOCUMENTS, please add:
-- 5,022,057
  5,132,990
  5,487,092
  5,680,594
  6,175,603
  6,239,626 --

Signed and Sealed this

Twenty-eighth Day of December, 2004

JON W. DUDAS
*Director of the United States Patent and Trademark Office*